(12) United States Patent
Wolf et al.

(10) Patent No.: US 8,783,615 B2
(45) Date of Patent: Jul. 22, 2014

(54) LOADS INTERFACE, PARTICULARLY LOADS INTERFACE OF AN AIRCRAFT STRUCTURE AND APPLICATION OF SAID LOADS INTERFACE

(75) Inventors: Christian Wolf, Neu-Ulm (DE); Hanno Niemann, Nuremberg (DE); Matthias Hopf, Alerheim (DE); Patrik Schmiedel, Donauworth (DE)

(73) Assignee: Airbus Helicopters Deutschland GmbH, Donawoerth (DE)

( * ) Notice: Subject to any disclaimer, the term of this patent is extended or adjusted under 35 U.S.C. 154(b) by 403 days.

(21) Appl. No.: 13/553,167

(22) Filed: Jul. 19, 2012

(65) Prior Publication Data

US 2013/0032660 A1 Feb. 7, 2013

(30) Foreign Application Priority Data

Aug. 1, 2011 (EP) .................................... 11400038

(51) Int. Cl.
*B64C 1/14* (2006.01)
(52) U.S. Cl.
USPC ..................... 244/129.5; 244/129.4; 244/119; 244/117 R
(58) Field of Classification Search
USPC ....... 244/129.5, 117 R, 119, 129.4, 131, 127, 244/118.2
See application file for complete search history.

(56) References Cited

U.S. PATENT DOCUMENTS

| | | | | |
|---|---|---|---|---|
| 4,132,825 | A * | 1/1979 | Hahn | 267/137 |
| 5,667,169 | A | 9/1997 | Erben | |
| 6,378,806 | B1 | 4/2002 | Erben | |
| 7,726,602 | B2 * | 6/2010 | Llamas Sandin | 244/54 |
| 7,837,148 | B2 * | 11/2010 | Kismarton et al. | 244/123.1 |
| 8,418,961 | B2 * | 4/2013 | De Freitas et al. | 244/129.5 |
| 8,443,575 | B1 * | 5/2013 | Tanner et al. | 52/784.1 |
| 8,657,230 | B2 * | 2/2014 | Woodland et al. | 244/118.1 |
| 2002/0008179 | A1 * | 1/2002 | Bluem et al. | 244/129.5 |
| 2008/0164373 | A1 * | 7/2008 | Roming | 244/129.5 |
| 2009/0078826 | A1 * | 3/2009 | Haensch et al. | 244/129.5 |
| 2009/0152398 | A1 * | 6/2009 | Risch | 244/129.5 |
| 2010/0252682 | A1 * | 10/2010 | Pahl | 244/129.5 |
| 2012/0187247 | A1 * | 7/2012 | Delgado Jareno et al. | 244/129.5 |

FOREIGN PATENT DOCUMENTS

| | | |
|---|---|---|
| DE | 102006054431 A1 | 5/2008 |
| DE | 102009057012 A1 | 6/2011 |
| FR | 2947241 A1 | 12/2010 |

OTHER PUBLICATIONS

Search Report and Written Opinion; Application No. EP 11400038; dated Jan. 18, 2012.

* cited by examiner

*Primary Examiner* — Christopher P Ellis
(74) *Attorney, Agent, or Firm* — Brooks Kushman P.C.

(57) ABSTRACT

A loads interface (1) of an aircraft structure with an edge member (6) and a background structure both preferably made from fiber reinforced plastics. A loads transferring flange (2) is adapted and mounted to said edge member (6) to transmit bending moments into the background structure. Said loads transferring flange (2) is provided with two angled upper and lower planes (8, 9). Said edge member (6) is provided with two angled edge member's upper and lower transfer planes (10, 11). The two angled upper and lower planes (8, 9) and the two angled edge member's upper and lower transfer planes (10, 11) are paired essentially parallel and respectively oriented to each other with an angle of approximately 90°. The invention relates as well to applications of such a loads interface (1).

7 Claims, 2 Drawing Sheets

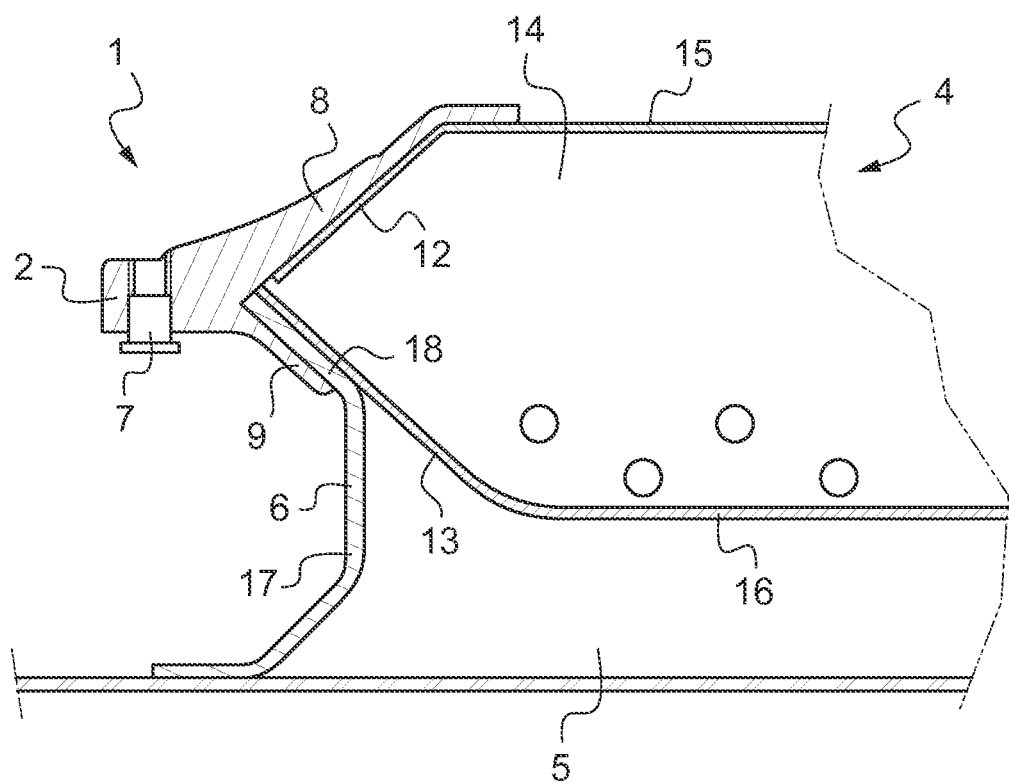

Figure 1:
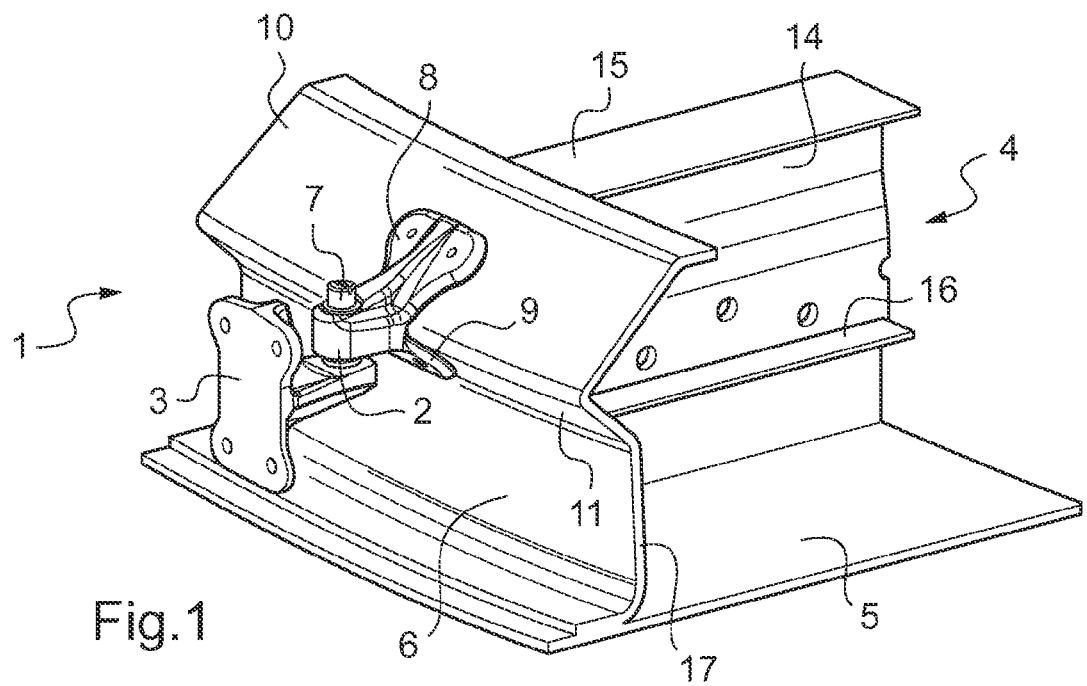

LOADS INTERFACE, PARTICULARLY LOADS INTERFACE OF AN AIRCRAFT STRUCTURE AND APPLICATION OF SAID LOADS INTERFACE

CROSS-REFERENCE TO RELATED APPLICATIONS

The present application claims priority to European patent application EP 11 400038.3 filed on Aug. 1, 2011, the disclosure of which is incorporated in its entirety by reference herein.

BACKGROUND OF THE INVENTION (1) Field of the Invention

The invention relates to a loads interface, particularly a loads interface of an aircraft structure with the features of the preamble of claim 1 and to applications of said loads interface with the features of the preamble of claim 8.

(2) Description of Related Art

Door fittings of an airplane door are used for mounting the door in a form locking engagement to the airplane fuselage in flight conditions. In these conditions internal pressure is acting on the door structure and said internal pressure results in concentrated pointed loads at the corresponding contact points between the door and the fuselage, which are acting partly in a radial direction, partly in a circumferential direction to the airplane's fuselage. Said door fittings are part of the primary structure of a typical airplane door. Any transfer of concentrated pointed loads from the door leads to a multi-axial loading state at the door fittings.

The document U.S. Pat. No. 5,667,169 A discloses a door system for a passenger airplane with a bearing and guiding device which operates between a door leaf and a door frame, as well as a lifting device which is arranged between the bearing and guiding device and the door leaf. A lifting device moves the door leaf at the end of the closing movement transversely to the moving path of the guiding device with a form-locking engagement with door-frame-fixed receiving elements into the completely closed position and, at the start of the opening operation, in the opposite lifting direction out of the form-locking engagement. Any specific details of connecting the door fittings to the background structure taking into account principles of load transfer are not addressed.

The document U.S. Pat. No. 6,378,806 B1 discloses a door for an enclosed space under pressure, such as an aircraft cabin. Redundant door stops are secured to the door edges and cooperate with redundant frame stops secured to a door frame in an aircraft body. The door stops and the frame stops are arranged in pairs. Door fittings directly flanged to the edge member are suitable for metallic structures with isotropic material behaviour. In case of a fiber composite background structure any high fitting loads introduced perpendicularly to a laminate plane of an edge member of said state of the art would be liable to problems if there wouldn't be any metallic suspensions and/or brackets as back up.

The document FR 2 947 241 A1 discloses a frame for a door provided at an opening in an aircraft fuselage defined by a skin, said frame including an upper longitudinal stiffener and a lower longitudinal stiffener connecting two vertical substructures together, which are arranged on either side of the opening at which at least one abutment is provided for transferring the radial forces exerted by the door, characterized in that each vertical substructure includes at least three walls made of a composite material and connected together so as to form a closed and hollow profile in order to obtain a shell structure.

The document DE 10 2006 054431 A1 discloses an arrangement with reinforcement elements e.g. stringers and bulkheads, associated to a fuselage skin, and a door surrounding structure integrally or partially integrally designed and including a connecting surface facing toward a fuselage skin. The connecting surface is connectable with a support surface of the fuselage skin. The door surrounding structure exhibits a door surrounding frame dividingly provided in a circumferential direction of a fuselage structure, which is connectable in a region of a center section of a door cutout.

The document DE 102006054431 A1 discloses a door fitting for the mounting of doors and flaps to the fuselage structure and/or wing structure of an aircraft with a retaining part, which holds the bearing elements for the door or flap and with a flange, which is used for the fastening to the door structure or wing structure, the door holder and flange being formed as a single part in the form of a flat-surfaced, plate-like component. Any torque, which is typically acting on the door fitting, cannot be well compensated by this type of component.

BRIEF SUMMARY OF THE INVENTION is an objective of the invention to provide a loads interface, particularly a loads interface of an aircraft structure, that is suitable for a smooth transfer of concentrated pointed loads into or out of a background structure made from fiber reinforced plastics and to provide applications of said loads interface.

The solution is provided with a loads interface, particularly a loads interface of an aircraft structure with the features of claim 1 and with applications of said loads interface with the features of claim 8. Preferred embodiments of the invention are presented with the subclaims.

According to the invention a loads interface, particularly a loads interface of an aircraft structure, comprises an edge member and a background structure both preferably made from fiber reinforced plastics. The background structure is particularly a grid-like background structure comprising at least one beam. The edge member is adapted to the background structure.

The loads interface further comprises a loads transferring flange adapted and mounted to said edge member, said loads transferring flange being designed to transfer loads into the background structure, namely transverse loads resulting from internal pressure and/or circumferential loads resulting from frictional movement between door and fuselage contact points and bending moments and/or torsional moments resulting from said loads. Said edge member is shaped with at least one angled plane and said loads transferring flange is shaped with two angled planes with the respective angled transfer planes of said edge member and said planes of said loads transferring flange being essentially parallel. Said two planes of said loads transferring flange are oriented to each other with an angle of approximately 90°. The grid-like background structure with said at least one beam is oriented with an angle of preferably 90° to said edge member.

The inventive loads interface allows transfer of concentrated, pointed loads from e.g. a door structure to a fuselage of the aircraft, namely through a loads transferring flange such that said transverse loads and any bending moments, resulting at the interface of said loads transferring flange and said edge member from said transverse loads, become mostly in-plane membrane loads thus avoiding overstressing the material of the edge member and/or any appendent member. The inventive loads interface is a suitable design for ensuring a sustainable load transfer of a multi-axial loading state. The inventive loads interface provides for a loads transfer/introduction into a fiber composite, grid-like background structure by compression, increased shear and direct introduction of bending moments in beam flanges. The inventive loads interface ensures that—supplemental to the in-plane membrane loads—a significant portion of the transferred loads will be introduced in the fiber composite grid-like background structure by compressive loading, which is preferred in comparison to loads transfer through tensile loading of an edge member and a background structure made from fiber reinforced plastics transverse to the members' respective longitudinal axes. Furthermore, the inventive loads interface improves load introduction, with the consequence of an increased share of shear loads said shear loads being also a preferable way for loads transfer into the grid-like fiber composite structure of the invention. The inventive loads interface allows good accessibility and a good replacement ability of the loads transferring flange by mounting it to the edge member and an improved compensation of torque by the two respectively angled planes.

According to a preferred embodiment of the invention said edge member is provided with two angled transfer planes said two angled transfer planes being integral and paired essentially parallel to said two angled planes of the loads transferring flange for improved load transfer.

According to a further preferred embodiment of the invention the grid-like background structure comprises at least one beam with a main plane (web) and an upper belt and a lower belt with respective belt planes essentially rectangular to said main plane. Bending moments from the loads transferring flange are compensated along the component's longitudinal axis through preferably direct moment introduction into said belt planes of said upper belt and said lower belt of the beam. As a result of the loads introduction directly into the beam flanges with the inventive loads interface, metallic suspension structures and brackets used in state-of-the-art designs of loads interfaces in fiber composite structures can be removed or reduced to a minimum allowing a reduction of manufacturing steps, time, costs and structural weight while stability and strength is maintained.

According to a further preferred embodiment of the invention said at least one beam is made from fiber reinforced plastics with main fiber directions in said main plane of said at least one beam and said upper belt and lower belt are made from fiber reinforced plastics with respective main fiber directions in said respective belt planes for improved shear stiffness and strength.

According to a further preferred embodiment of the invention the loads transfer flange is connected to the lower belt of the beam by fixation elements, such as bolts, rivets, fasteners, with the lower belt warped towards the load transfer flange. Portions of the concentrated pointed loads applied to the loads transfer flange are transferred into the grid-like component through compression for improved absorption in the beam of fiber composite allowing to use fixation elements, such as bolts, rivets, fasteners, for the residual loads.

According to a further preferred embodiment of the invention the loads transfer flange is directly connected to said upper and said lower belts of the beam with the upper belt and lower belt of fiber composite each comprising end sections being tapered or warped towards the loads transfer flange. According to this embodiment of the invention any bending moment applied to the loads transfer flange will be directly introduced through shear in the upper and lower belt of the beam.

According to a further preferred embodiment of the invention an outer skin, preferably made from fiber reinforced plastics, is provided, with said outer skin and said edge member being adapted to said beam.

A further advantage of the inventive loads interface with the loads transfer flange being directly connected to both angled planes of the edge member is that any torque around the axis of the beam applied to the loads transfer flange will be partly reacted through shear forces in the edge member made of fiber composite.

According to a preferred embodiment of the invention the loads interface is applied for a pointed load introduction/reaction into/from a fiber composite structural member, such as airplane doors and hatches, airplane door surround structures like fuselage-sided door frames, helicopter airframes or helicopter structural parts, airplane cabin floor grids, vehicle body work and other grid-like structures.

BRIEF DESCRIPTION OF THE SEVERAL
VIEWS OF THE DRAWINGS

A preferred embodiment of the invention will be described with reference to the following description and the attached drawings.

Figure 2:
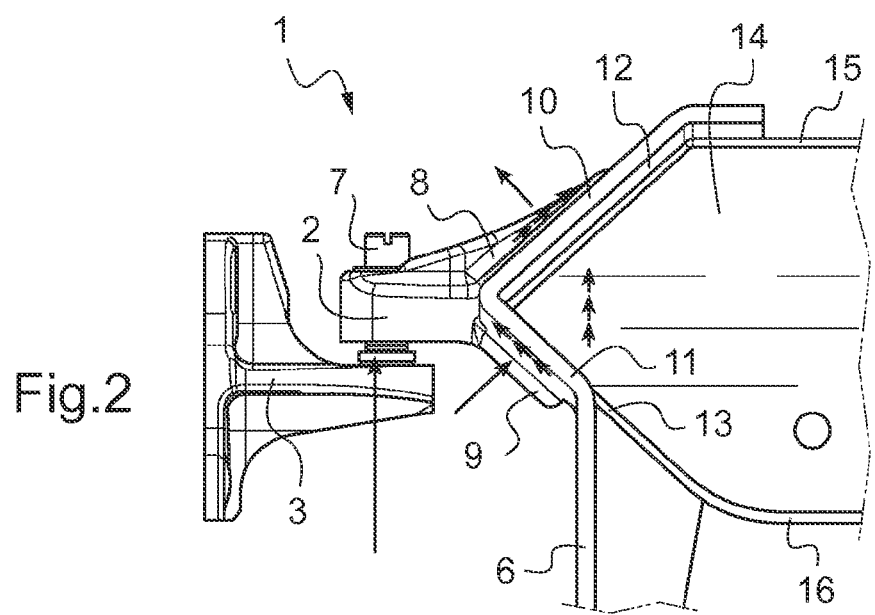

FIG. 1 shows a spherical view of the loads interface according to the invention, FIG. 2 shows a lateral view of the loads interface according to the invention, and FIG. 3 shows a cross sectional view of a further embodiment of the loads interface according to the invention.

DETAILED DESCRIPTION OF THE INVENTION

According to FIG. 1 a loads interface 1 comprises a loads transferring flange 2 detachably supported by a fuselage-sided flange 3 of an aircraft structure (not shown). The loads transferring flange 2 is mounted to an aircraft door 4 with an essentially planar or slightly curved shell type outer skin 5 and an edge member 6. Transverse loads are transferred via the stiff loads transferring flange 2 from the aircraft door 4 during flight when internal pressure biases the aircraft door 4 against any of the corresponding contact points 3 on the fuselage. Loads in the loads transferring flange 2 result as well from friction between connection points of the aircraft door 4 and the fuselage, said latter loads being rectangular with regard to said first mentioned transverse loads. Transfer of said multi-axial loads through the stiff loads transferring flange 2 results in bending moments from the internal pressure and torsional moments from the frictional loads at the interface 1 of the transferring flange 2 with the edge member 6.

Screw means 7 are provided to adjust a distance of said loads transferring flange 2 with regard to said contact point on the fuselage 3, said distance being adjustable rectangular with regard to the outer skin 5 by rotation of said crew means 7 relative to said loads transferring flange 2.

The loads transferring flange 2 comprises an upper transfer plane 8 and a lower transfer plane 9 angled at about 90° to each other. The upper transfer plane 8 and the lower transfer plane 9 are each provided with openings to allow fixation of the loads transferring flange 2 by means of bolts, rivets or corresponding fasteners (not shown). The loads transferring flange 2 is stiffened with rips between contact point and the upper transfer plane 8 and the lower transfer plane 9. The loads transferring flange 2 is manufactured of metal or composite material.

An edge member's upper transfer plane 10 and an edge member's lower transfer plane 11 are angled at about 90° to each other. The edge member 6 is made of fiber composite material. The edge member 6 is attached with said edge member's upper transfer plane 10 and said edge member's lower transfer plane 11 to two underlying upper and lower end sections 12, 13 (see FIG. 2) of an interior grid-like structure with at least one beam 14. The two underlying upper and lower end sections 12, 13 are angled correspondingly to the edge member's upper transfer plane 10 and the edge member's lower transfer plane 11 to allow planar support of the edge member 6 by the background structure. The interior beam 14 is provided with an upper belt 15 and a lower belt 16 said belts 15, 16 being tapered or warped towards the underlying upper and lower end sections 12, 13. The edge member 6 extends from the edge member's lower transfer plane 11 with an edge member's lower profile 17 that is attached to the outer skin 4. The interior beam 14 and its upper and lower belt 15, 16 are made of a fiber composite material with the fibers directed along the respective belt planes.

The underlying upper and lower end sections 12, 13 have an angle of preferably 45° (135°) towards the outer skin 5.

According to FIG. 2 corresponding features are referred to with the references of FIG. 1. The upper belt 15 and the lower belt 16 are tapered or warped towards the upper transfer plane 8 and the lower transfer plane 9 with underlying upper and lower end sections 12, 13. Any transverse loads acting on the loads transferring flange 2 will be transferred via the upper transfer plane 8 and the lower transfer plane 9 of the loads transferring flange 2 into the edge member's upper transfer plane 10 and the edge member's lower transfer plane 11 of the edge member 6 and most of all into the underlying upper and lower end sections 12, 13 of the beam 14 with an increased shear force due to the tapered flanges. A significant part of the transverse loads will be introduced into the lower transfer plane 9 and into the underlying lower end section 13 of the lower belt 16 as compressive loading.

Any torque resulting from the loads transferring flange 2 will be countered by counteracting shear forces in the edge member's upper transfer plane 10 and the edge member's lower transfer plane 11 of the edge member 6.

According to FIG. 3 corresponding features are referred to with the references of FIGS. 1, 2. The upper belt 15 and the lower belt 16 are tapered or warped towards the upper transfer plane 8 and the lower transfer plane 9 with underlying upper and lower end sections 12, 13. Any transverse loads acting on the loads transferring flange 2 will be transferred via the upper transfer plane 8 and the lower transfer plane 9 of the loads transferring flange 2 into the single transfer plane 18 of the edge member 6 and most of all into the underlying upper and lower end sections 12, 13 of the upper belt 15 and the lower belt 16 of the beam 14 with an increased shear force due to the tapered flanges. A significant part of any transverse loads will be introduced into the single transfer plane 18 and into the underlying lower end section 13 as compressive loading and a torque resulting from the loads transferring flange 2 will be partly countered by counteracting shear forces in the transfer plane 18 of the edge member 6 said edge member 6 being adapted and attached to the outer skin 4 made of fiber reinforced plastics.

An application of the loads transferring flange 2 to metallic door structures is also conceivable and might lead to significant weight reduction. The loads interface 1 is applicable to airplane doors & hatches, airplane door surround structures like fuselage-sided door frames, helicopter airframes or helicopter structural parts (not shown).

The underlying principle for load introduction/reaction of a pointed load into a fiber composite structural member could also be applied to many other fiber composite products apart from airplane doors like airplane cabin floor grids, vehicle body work and other grid-like structures.

| Reference list | | |
|---|---|---|
| No. | Description | Remark |
| 1 | Loads interface | |
| 2 | Loads transferring flange | |
| 3 | Fuselage-sided flange | |
| 4 | Aircraft door | |
| 5 | Outer skin | |
| 6 | Edge member | |
| 7 | Screw means | |
| 8 | Upper transfer plane of loads transferring flange | Part of 2 |
| 9 | Lower transfer plane of loads transferring flange | Part of 2 |
| 10 | Upper transfer plane of edge member | Part of 6 |
| 11 | Lower transfer plane of edge member | Part of 6 |
| 12 | Upper end section of beam | Part of 14 |
| 13 | Lower end section of beam | Part of 14 |
| 14 | Beam | |
| 15 | Upper belt of beam | Part of 14 |
| 16 | Lower belt of beam | Part of 14 |
| 17 | Lower profile of edge member | Part of 6 |
| 18 | Single transfer plane of edge member (further embodiment) | Part of 6 |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A loads interface, particularly a loads interface of an aircraft structure, comprising:

a grid-like structure preferably made from fiber reinforced plastics said grid-like structure comprising at least one edge member and one beam with said edge member being adapted to said beam and a loads transferring flange adapted and mounted to said edge member, wherein:

said loads transferring flange is provided with an angled upper transfer plane and an angled lower transfer plane to transmit transverse forces and bending moments resulting from transferring said transverse forces in said loads transferring flange and/or to transmit circumferential and/or longitudinal forces and torsional/bending moments resulting from transferring said circumferential and/or longitudinal forces in said loads transferring flange, said edge member is provided with at least one angled edge member's lower and/or upper transfer plane, said at least one angled edge member's lower and/or upper transfer plane being essentially parallel to one of the angled upper transfer plane or the angled lower transfer plane of said flange with said angled upper transfer plane and said angled lower transfer plane being respectively oriented to each other with an angle of approximately 90° and said grid-like structure comprising the at least one beam being oriented to said edge member with an angle of preferably 90°.

2. The loads interface according to claim 1, wherein said edge member is provided with the angled edge member's lower and the angled edge member's upper transfer plane said two angled edge member's upper and lower transfer planes being integral and paired essentially parallel to said two angled upper and lower transfer planes.

3. The loads interface according to claim 1, wherein the at least one beam comprises an upper belt and a lower belt with respective belt planes oriented with an angle of approximately 90° to a main plane of the at least one beam.

4. The loads interface according to claim 3, wherein said at least one beam is made from fiber reinforced plastics and said upper belt and lower belt are made from fiber reinforced plastics with respective main fiber directions along the longitudinal extension of said beam.

5. The loads interface according to claim 3, wherein the loads transferring flange is partly connected to the lower belt of the mentioned beam by fixation elements, such as bolts, rivets or corresponding fasteners.

6. The loads interface according to claim 3, wherein the loads transferring flange is directly connected to both belts of the beam through said fixation elements and the beam with the upper belt and lower belt comprises tapered or warped upper and lower end section towards the flange.

7. The loads interface according to claim 1, wherein, an outer skin, preferably made from fiber reinforced plastics, is provided, said outer skin with said edge member being adapted to said beam.

* * * * *